Dec. 9, 1969  W. MÜLLER  3,482,472
TRANSMISSION

Filed March 11, 1968  6 Sheets-Sheet 1

Inventor:
Werner Müll
By Michael S. Striker
Attorney

Dec. 9, 1969 W. MÜLLER 3,482,472
TRANSMISSION

Filed March 11, 1968 6 Sheets-Sheet 3

Inventor:
Werner Müller
By Michael S. Striker
Attorney

Inventor:
Werner Müller
By Michael S. Stonker
Attorney

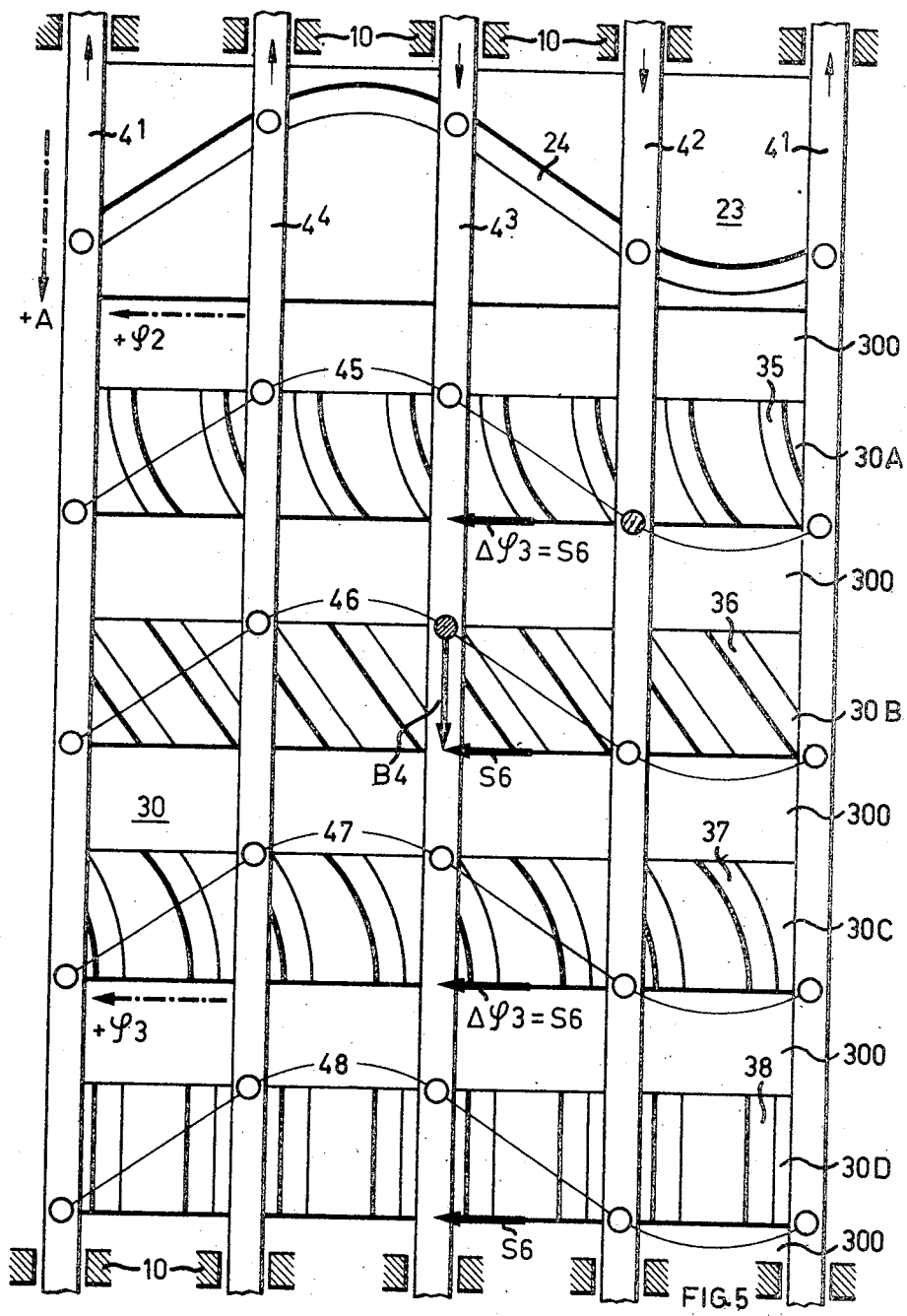

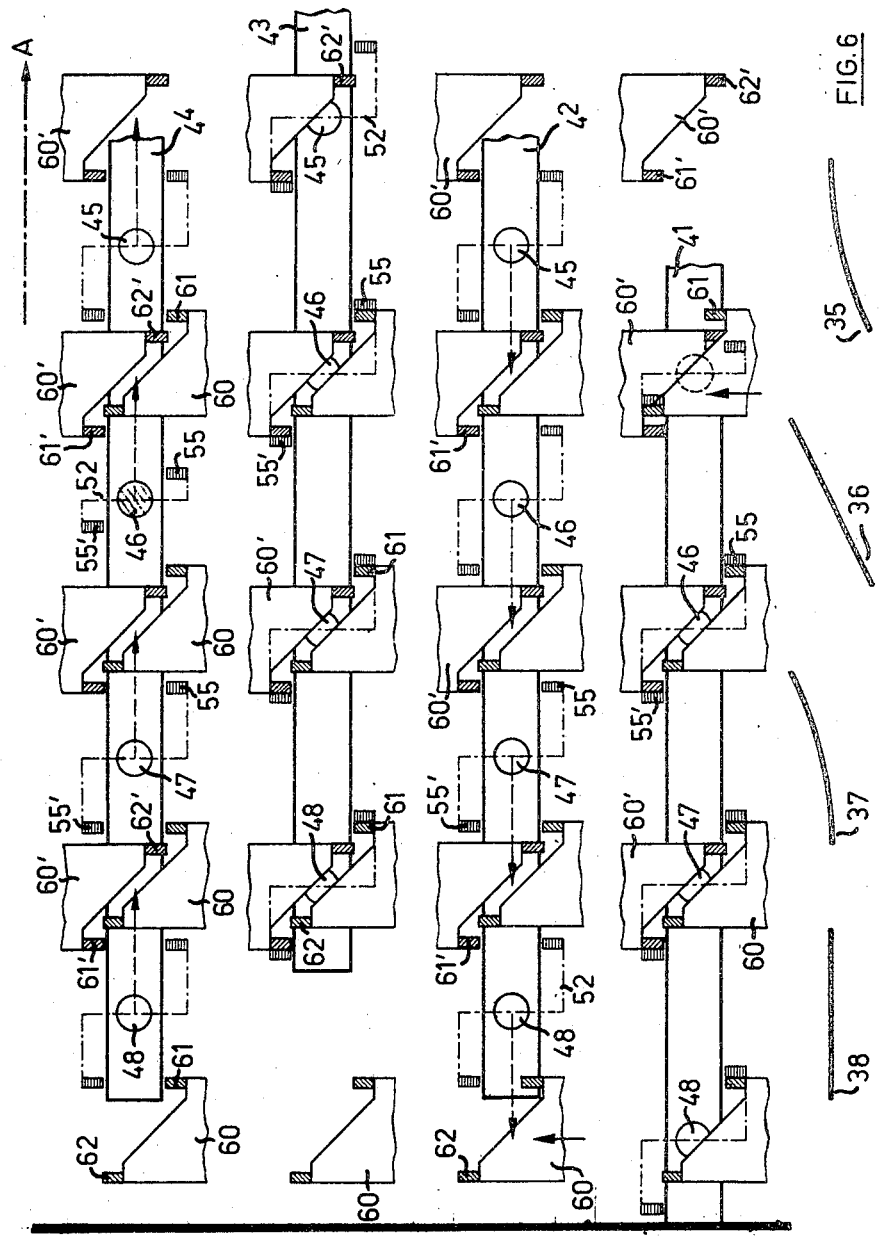

United States Patent Office 3,482,472
Patented Dec. 9, 1969

3,482,472
TRANSMISSION
Werner Müller, Aarau, Switzerland, assignor to Contraves AG, Zurich, Switzerland
Filed Mar. 11, 1968, Ser. No. 712,006
Claims priority, application Switzerland, Mar. 22, 1967, 4,101/67
Int. Cl. B23q *17/00;* F16h *27/02*
U.S. Cl. 74—815   12 Claims

ABSTRACT OF THE DISCLOSURE

A transmission wherein a continuously driven input shaft transmits torque to a coaxial output shaft by way of reciprocable carriers whose movements are out of phase and which receive motion from a cylinder cam on the input shaft. The output shaft is provided with several axially spaced coaxial indexing wheels having sets of parallel grooves adapted to receive indexing pins mounted on the carriers. The lead of grooves in any given indexing wheel is the same but is different from the lead of grooves in the other indexing wheels. The indexing pins can be extended or retracted in a desired sequence by a control system which can be programmed to effect desired angular displacements of the output shaft. The grooves in one of the indexing wheels are parallel with the common axis of the shafts so that the output shaft is at a standstill if an indexing pin extends into a groove of the one wheel. The lead of grooves in the remaining indexing wheels is such that the output shaft can be accelerated or decelerated in a clockwise or in a counterclockwise direction or can be driven at a constant speed in either direction.

BACKGROUND OF THE INVENTION

The present invention relates to transmissions in general, and more particularly to improvements in transmissions of the type wherein an output member can perform a desired sequence of reciprocatory or angular movements in a forward (clockwise) or rearward (counterclockwise) direction and wherein the output member can dwell between movements in forward or rearward direction.

Certain presently known transmissions wherein the output shaft moves intermittently or continuously employ a Geneva wheel with radial slots and a pin wheel. The pins of the pin wheel are controlled by electromagnets and are movable axially of the wheels in order to enter into or to be withdrawn from the slots of the Geneva wheel. Such transmissions are often employed for imparting intermittent movements to reciprocable parts of machine tools or the like. They replace conventional intermittently operated motors or servomotor systems. A serious drawback of all such conventional constructions is that the output member is subjected to shocks in response to successive impulses during movement in a forward direction or in reverse as well as during standstill, and also that the intervals required for effecting a change in the direction of movement of the output member are often too long.

SUMMARY OF THE INVENTION

It is an object of my invention to provide a transmission which can impart to a reciprocable or rotary output member any desired number or sequence of movements in a forward or in a rearward direction, and wherein successive movements can be imparted without any appreciable shocks and practically without any intervals therebetween.

Another object of the invention is to provide a transmission wherein the output member can derive any desired sequence or combination of movements from a continuously driven input member and wherein the mechanism which transmits motion from the input member to the output member can be programmed to impart to the output member a desired sequence of movements with a desired number of shorter or longer intervals between successive movements.

An additional object of the invention is to provide a transmission wherein the output member can be accelerated or decelerated gradually and can rotate at a constant speed upon completed acceleration in a clockwise or in a counterclockwise direction.

A further object of the invention is to provide a transmission which occupies little room and which comprises a relatively small number of simple parts.

The improved transmission comprises a driven input member (preferably a shaft which is rotated by a prime mover at a constant speed in a predetermined direction), a movable output member which preferably comprises a shaft coaxial with the input member and is provided with a plurality of indexing portions (preferably resembling wheels or wheel segments) each having a surface formed with a set of grooves having the same lead but different from the lead of grooves in another indexing portion, carrier means comprising at least one carrier reciprocable in parallelism with the axis of the input member and receiving motion from the input member, a plurality of indexing members which preferably resemble pins and are movably supported by the carrier, there being one indexing member for each indexing portion of the output member, and control means for moving selected indexing members into the adjoining grooves of the respective indexing portions to thereby influence the position of the output member in response to movement of the carrier while an indexing member extends into a groove of the associated indexing portion. The lead of grooves in one of the indexing portions may be such that the grooves can hold the output member at a standstill. At least one other set of grooves may be provided with a lead which causes gradual acceleration or deceleration of the output member from zero speed to a predetermined speed, or vice versa, and a further indexing portion may be provided with grooves whose lead is such that they can maintain the output member at the aforementioned predetermined speed when the corresponding indexing member extends into one of these grooves. For example, the transmission may comprise four reciprocable carriers whose movements are out of phase and the output member may be provided with four axially spaced indexing portions, i.e., each carrier is then provided with four extendible and retractible indexing pins.

The novel features which are considered as characteristic of the invention are set forth in particular in the appended claims. The improved transmission itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 5 is a developed view of a cam on the input member and of indexing portions on the output member; and FIG. 6 illustrated certain parts of the control system for the indexing members on the carriers.

DESCRIPTION OF THE PREFERRED EMBODIMENTS

Figure 1:
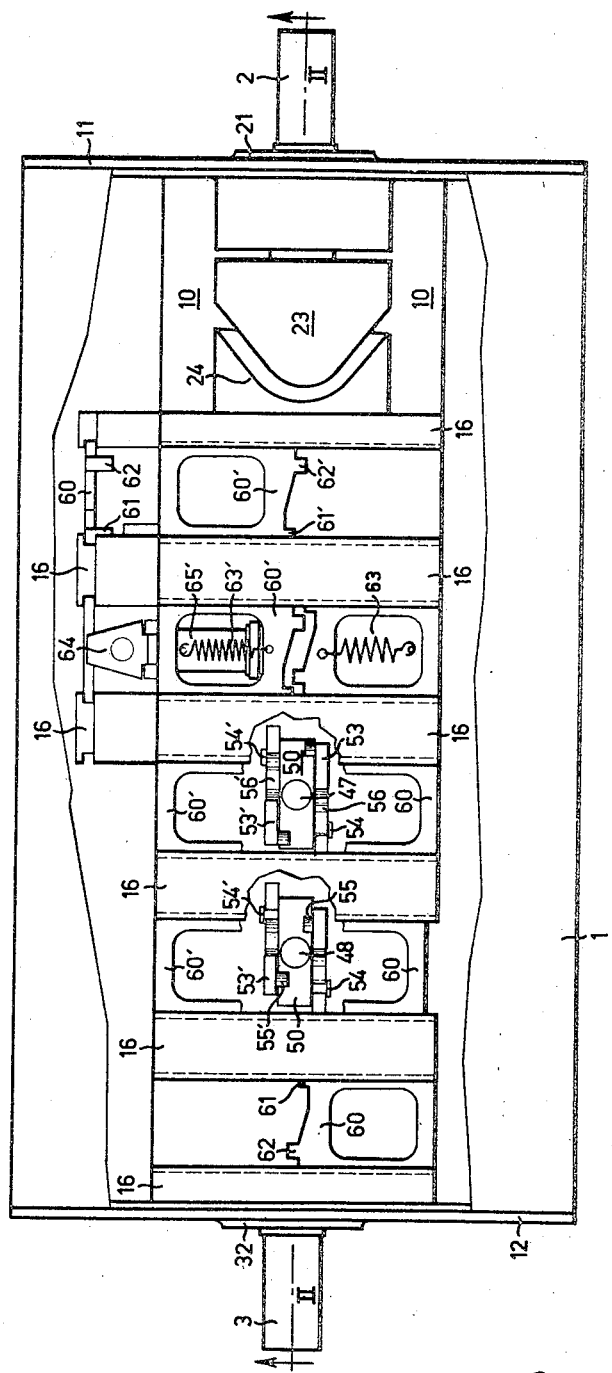
FIG. 1 is a top plan view of a transmission which embodies my invention, with the housing partly broken away.
Figure 2:
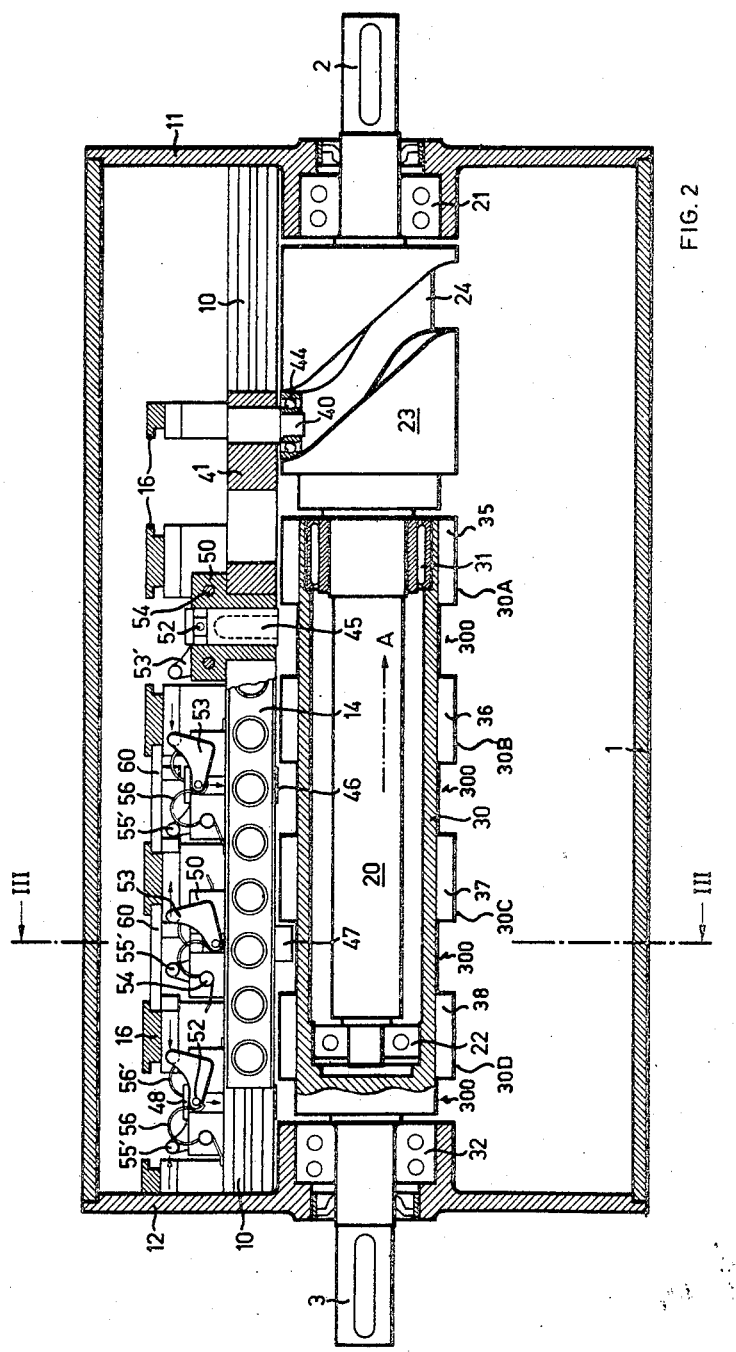
FIG. 2 is an axial sectional view as seen in the direction of arrows from the line II—II of FIG. 1.
Figure 3:
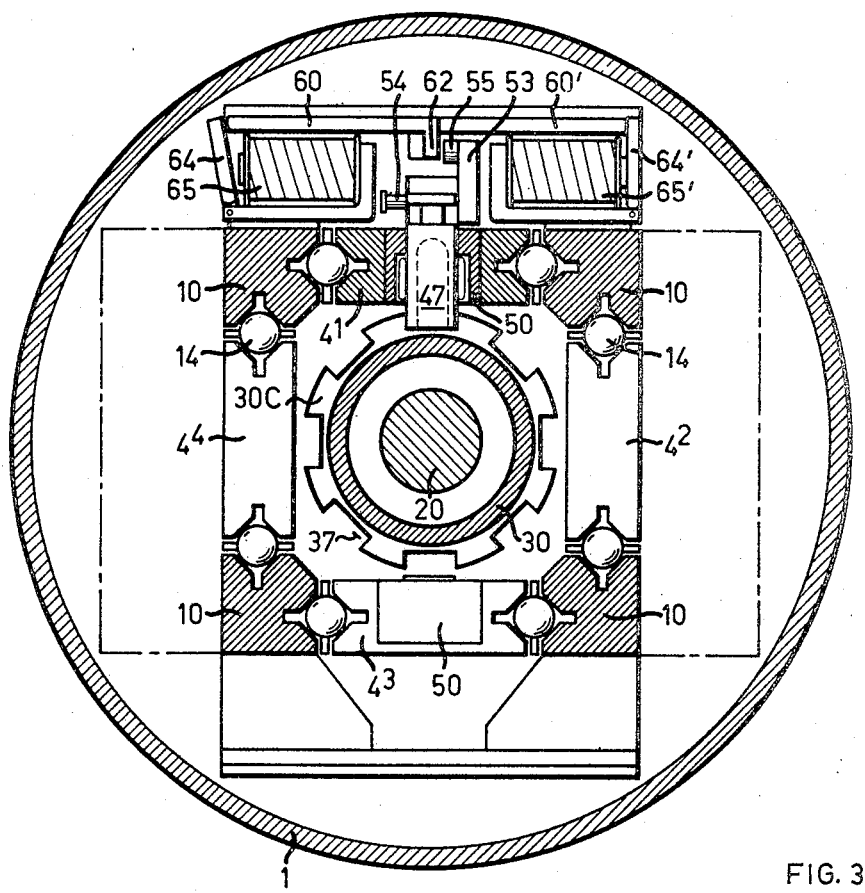
FIG. 3 is a transverse sectional view as seen in the direction of arrows from the line III—III of FIG. 2.

Referring first to FIGS. 1 to 3, there is shown a transmission which comprises a housing or case 1 having two end walls 11 and 12. An input shaft 2 which is constantly driven by an electric motor or another suitable prime mover (not shown) rotates in antifriction bearings 21 mounted in the end wall 11. The output shaft 3 is coaxial with the input shaft 2 and is rotatable in antifriction bearings 32 mounted in the end wall 12. The input shaft 2 comprises a cylindrical extension 20 which is rotatable in antifriction bearings 22, 31 provided in a hollow cylindrical extension or sleeve 30 of the output shaft 3. A cylinder cam 23 on the input shaft 2 is located between the bearings 21 and 31 and is provided with an endless cam groove 24 of substantially sinusoidal outline (see the developed view of this groove in the upper part of FIG. 5). The sleeve 30 of the output shaft 3 is rigid or integral with four axially spaced coaxial indexing portions or wheels 30A, 30B, 30C, 30D which are provided with cylindrical peripheral surfaces having groups or sets of equidistant parallel cam grooves 35, 36, 37, 38. The lead of any set of grooves is different from the lead of grooves in each other set, see particularly FIG. 4.

The housing 1 further accommodates four equidistant guide rails 10 which are parallel with the common axis of the shafts 2, 3 and serve to guide four elongated bar-shaped carriers $4^1$, $4^2$, $4^3$, $4^4$. These carriers are mounted in rows of antifriction bearing elements 14 (see particularly FIG. 3) and receive reciprocatory motion from the input shaft 2 through the intermediary of four pin-shaped followers 40 each of which extends into the endless groove 24 of the cylinder cam 23. Each follower 40 is surrounded by an antifriction bearing 44 whose outer race engages the surfaces bounding the groove 24. It will be seen that the carriers $4^1$–$4^4$ are caused to move back and forth in parallelism with the common axis of the shafts 2, 3 when the input shaft rotates to drive the cylinder cam 23. The reciprocatory movements of all four carriers are synchronized but are out of phase by 90 degrees.

Each of the four carriers $4^1$–$4^4$ is provided with four extendible and retractible indexing members or pins 45, 46, 47, 48, one for each of the indexing wheels 30A–30D. If a selected indexing pin 45, 46 or 47 extends into one groove of the associated indexing wheel 30A, 30B or 30C, the output shaft 3 is caused to change its angular position to the extent determined by the lead of the respective groove 35, 36 or 37. The lead of the grooves 38 is such that the corresponding indexing pins 48 can move axially of the shafts 2, 3 without causing the indexing wheel 30D to turn, i.e., the angular position of the output shaft 3 then remains unchanged. This will be readily understood by referring to the lower part of FIG. 5 which shows that the grooves 38 of the indexing wheel 30D are parallel with the axis of the sleeve 30. The output shaft 3 can be rotated in a clockwise or in a counterclockwise direction, depending on the direction of reciprocatory movement of that carrier which is momentarily coupled to the sleeve 30.

The output shaft 3 can perform the following movements:

(a) It can remain at a standstill (S) when all of the indexing pins are disengaged from the associated indexing wheels or when one of the pins 48 extends into the adjoining groove 38 in the indexing wheel 30D.

(b) It can be rotated in a clockwise (forward direction ($B_v$) or in a counterclockwise (reverse) direction ($B_r$) by a half step with constant acceleration.

(c) It can be rotated in a clockwise direction ($G_v$) or in a counterclockwise direction ($G_r$) by a full step at a constant angular speed.

(d) It can be rotated in a clockwise direction ($V_v$) or in a counterclockwise direction ($V_r$) by a half step with gradual deceleration.

When caused to turn in a clockwise direction, the output shaft 3 can perform the following sequence of movements:

$$n \cdot S + B_v + mG_v + V_v + n \cdot S$$

When caused to turn in a counterclockwise direction, the shaft 3 can perform the following sequence of movements:

$$n \cdot S + B_r + mG_r + V_r + n \cdot S$$

The coefficients $m$ and $n$ are whole numbers including zero.

The control means for moving the indexing pins 45–48 between extended and retracted positions comprises sockets 50 which are installed in the carriers $4^1$–$4^4$ and each of which accommodates one of the indexing pins for movement radially of the common axis of the shafts 2 and 3. Each indexing pin (see the indexing pin 45 on the carrier $4^1$ of FIG. 2) is provided with two coaxial radially extending projections or studs 52 which are guided in axially parallel slots machined into the respective socket 50. Each of these studs 52 is coupled with one arm of one of two two-armed clutching levers 53, 53'. The levers 53, 53' are fulcrumed on pivots 54, 54' of the respective socket 50 and the other arm of each of these levers carries a motion receiving projection 55, 55'. Each of the levers 53, 53' is biased by a leaf spring 56, 56', one end of which bears against the corresponding stud 52 and the other end of which engages the pivot 54' or 54 of the adjoining lever (53' or 53). This is best shown in FIG. 2 wherein the indexing pins 45, 46, 48 on the carrier $4^1$ are shown in retracted position but the pin 47 extends into one of the grooves 37 in the indexing wheel 30C. The springs 56, 56' tend to maintain the corresponding levers 53, 53' in either end position, i.e., in positions in which the associated indexing pins are extended or retracted. The projections 55, 55' of associated levers 53, 53' are spaced apart when the respective indexing pin is retracted. The projections 55, 55' of the levers 53, 53' which control the indexing pin 47 of FIG. 2 are closely adjacent to each other because the pin 47 is held in extended or operative position. The movements which the projections 55, 55' of the clutching levers 53, 53' perform under or against the action of their springs 56 are indicated in FIG. 2 by arrows. The means for pivoting the levers 53, 53' comprises pairs of slides or carriages 60, 60' (see particularly FIG. 1) which are respectively provided with strips or actuating members 61, 62 and 61', 62'. The slides 60, 60' are reciprocable in fixed profiled ways 16 which extend at right angles to the direction of reciprocatory movement of carriers $4^1$ to $4^4$. Each of these slides is coupled with a helical return spring 63, 63' which tends to maintain the respective slide in an idle or retracted position. The slides can be moved forwardly by armatures 64, 64' of electromagnets 65, 65'. The trips 61, 62 and 61', 62' can cooperate with the projections 55, 55' of the levers 53, 53' to move the respective indexing pins 45–48 to extended or retracted positions against the opposition of leaf springs 56, 56'. The manner in which these trips cooperate with the projections 55, 55' will be described in connection with FIG. 6.

Figure 4:
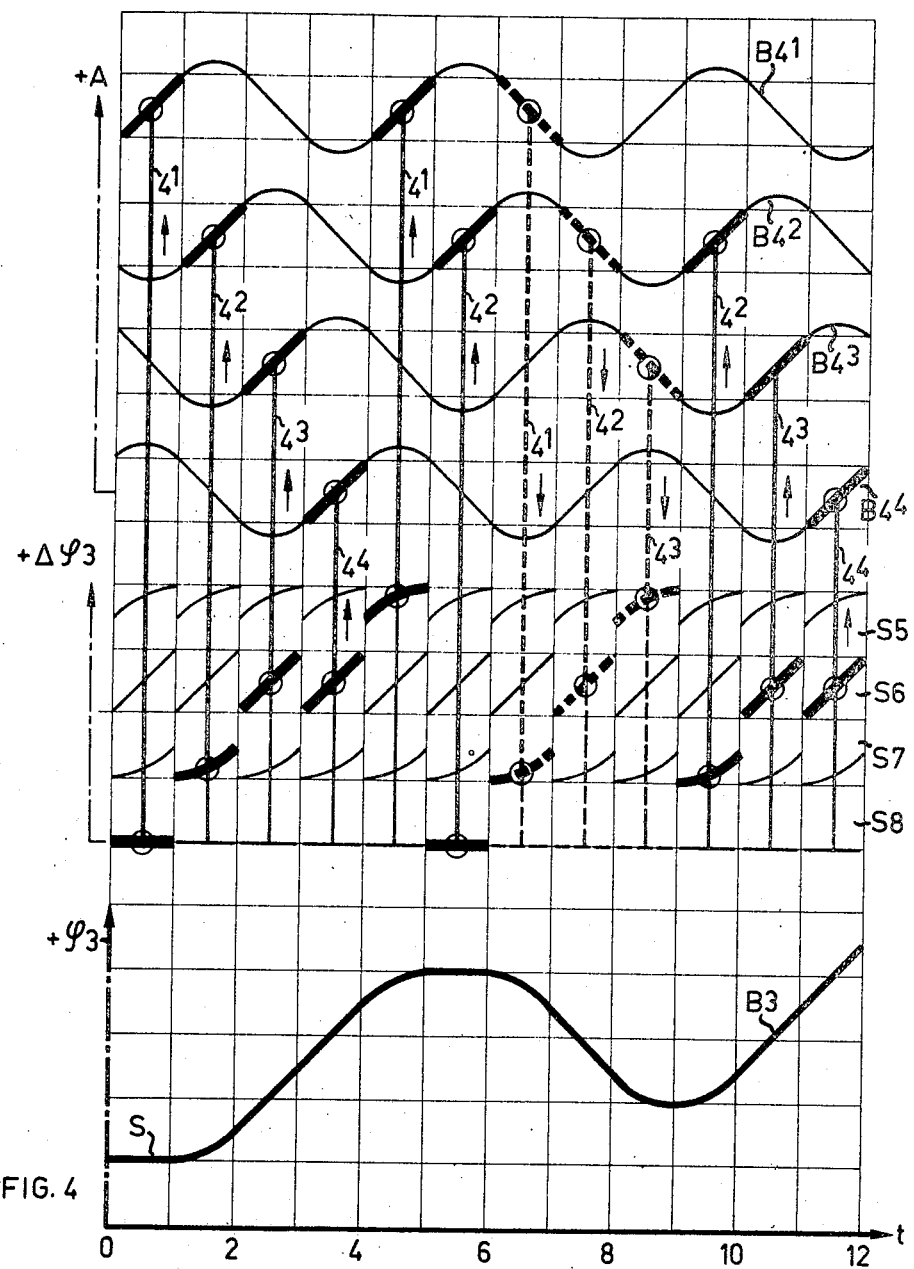
FIG. 4 is a diagram showing the movements of the carriers and of the output member during successive intervals of time.

FIGS. 4 and 5 illustrate certain parts of the transmission in a developed view. In FIG. 4, the time $t$ (in units of desired length) is measured along the abscissa. The curves $B4^1$, $B4^2$, $B4^3$, $B4^4$ respectively indicate reciprocatory movements of the four carriers $4^1$ to $4^4$ when the cylinder cam 23 rotates with the input shaft 2. Selected carriers are coupled with the indexing wheels 30A–30D at a time when they move at a constant speed, either in a forward direction (arrow A in FIG. 2) or backwards. The angular displacements and periods of dwell of the output shaft 3 are shown at S5, S6, S7 and S8. Angular movements of the output shaft 3 in a clockwise (forward) direction and the periods of dwell are indicated by heavy solid lines. Heavy broken lines indicate angular movements of the output shaft 3 in a counterclockwise (rearward) direction. The curve B3 of FIG. 4 indicates the composite movement of output shaft 3 during a certain period of time units 1–12). Angular displacements caused by engagement of the pins 45–47 with the respective wheels 30A–30C are either positive (clockwise) or negative (counterclockwise) displacements. Engagement of a pin 48 with the wheel 30D brings about a dwell of the output shaft 3. Angular displacements ($\phi$3) of the output shaft 3 are measured along the ordinate.

FIG. 5 shows certain parts of the transmission in positions they assume at the interval $t=2$ in the diagram of FIG. 4. The cylinder cam 23 and its endless cam groove 24, the sleeve 30 of the output shaft 3, and the grooves 35–38 of indexing wheels 30A–30D on this sleeve are shown in a developed view. Clockwise angular displacements of the shafts 2, 3 are respectively indicated by broken-line arrows $\phi$2 and $\phi$3. The carriers $4^1$ to $4^4$ move forwardly (broken-line arrows +A) or backwards. The thin-line curves indicate the paths of movement of the indexing pins 45 to 48. In the just completed preceding phase of movement (interval $t=1-2$ in FIG. 4), the indexing pin 45 of the carrier $4^2$ was in extended position, i.e., it was caused to extend into one of the grooves 35 in the indexing wheel 30A. Therefore, the output shaft 3 was caused to turn in a clockwise direction with constant acceleration from zero speed (during the interval $t=0-1$ in FIG. 4). In the stage ($t=2$) shown in FIG. 5, the indexing pin 45 of the carrier $4^2$ leaves the adjoining groove 35 and is retracted when the carrier $4^2$ reaches the end of its forward movement. The indexing pin 46 of the carrier $4^3$ was caused to move to extended position during the last end turn of the carrier $4^3$ so that it enters the adjoining groove 36 in the indexing wheel 30B. Therefore, the output shaft 3 is caused to turn in a clockwise direction, by a full step, and at a constant speed (see the interval $t=2-3$ in FIG. 4). This is the movement S6 shown in FIG. 5. The remaining movements can be readily interpreted on the basis of the preceding description.

FIG. 6 shows one each of the grooves 35, 36, 37 and 38. The four carriers $4^1$ to $4^4$ are shown in positions they assume during the interval $t=3-4$ of FIG. 4. The carrier $4^1$ is located at the left-hand end of its path (this is the lower end of the path, as viewed in FIG. 4); the carrier $4^2$ travels at a constant speed in a rearward direction (counter to that indicated by arrow A) toward its left-hand end position; the carrier $4^3$ dwells in its right-hand end position; and the carrier $4^4$ travels at a constant speed in a forward direction, i.e., in the direction indicated by the arrow A. The means for extending and retracting the indexing pins 45–48 of the carriers $4^1$ to $4^4$ are represented in FIG. 6 merely by the projections 55, 55' of the corresponding clutching levers 53, 53'. In order to move an indexing pin to retracted position when the corresponding carrier reaches the right-hand or the left-hand end position, the projections 55, 55' of the corresponding clutching levers 53, 53' must be moved apart under the action of their springs 56, 56' in response to impulses received from trips 61, 61'. The electromagnets 65, 65' are then deenergized. In order to move an indexing pin to extended position, the projections 55, 55' of the corresponding clutching levers 53, 53' must be moved toward each other when the corresponding carrier reaches an end position. This is achieved by the trips 62, 62' of the slides 60, 60' in response to energization of the respective electromagnets 65, 65'. In FIG. 6, the indexing pin 46 of the carrier $4^4$ is shown in extended position while the carrier $4^4$ travels at a constant speed in a forward direction (arrow A). Thus, the pin 46 extends into one of the grooves 36 in the indexing wheel 30B and causes the output shaft 3 to move in a clockwise direction by a full step and at a constant speed. When the carrier $4^4$ reaches its right-hand end position and is about to move backwards, the projection 55' on the associated clutching lever 53' is engaged and displaced by the trip 61' on the adjoining slide 60' so that the pin 46 is retracted. At the same time, the trip 62 on a slide 60 has caused the indexing pin 45 on the carrier $4^1$ to move to extended position by engaging the projection 55' of the associated clutching lever 53'. The carrier $4^1$ then performs a rightward stroke while its pin 45 extends into the adjoining groove 35 and causes the output shaft 3 to perform a half step with gradual deceleration to a full stop. The leftmost slide 60 for the carrier $4^2$ is located in a forward position (it has been moved upwardly, as viewed in FIG. 6). The carrier $4^2$ travels backwards at a constant speed (in a direction to the left) and, when it reaches the left hand end position, the lever 53' causes its indexing pin 48 to move to extended position so that the shaft 3 remains at a standstill during the next stage when the carrier $4^2$ performs a movement in forward direction. All other slides 60, 60' are held in retracted or idle positions.

The following combinations of movements or dwells of the output shaft 3 are possible by resorting to four indexing wheels 30A–30D having grooves 35–38 with a lead as shown in FIG. 5:

(1) When the output shaft 3 is idle because all of the indexing pins are in retracted positions or because one of the pins 48 extends into a groove 38 (the grooves 38 are parallel with the common axis of the shafts 2, 3 and hence with the direction of reciprocatory movement of carriers $4^1$ to $4^4$):

1.1 The output shaft remains at a standstill because one of the pins 48 extends into one of the grooves 38 in the indexing wheel 30D; or 1.2 the output shaft is gradually accelerated during angular movement in a clockwise direction while a pin 45 extends into one of the grooves 35 in the wheel 30A. The shaft 3 performs half a step in forward direction; or 1.3 the output shaft 3 is gradually accelerated during movement by half a step in a counterclockwise direction while a pin 47 extends into one of the grooves 37 in the wheel 30C.

(2) When the output shaft is accelerated in a clockwise direction (as per 1.2 above):

2.1 The output shaft continues to move in a clockwise direction and completes a full step in such direction while a pin 46 extends into the adjacent groove 36 of the wheel 30B; or 2.2 the output shaft is gradually decelerated back to a full stop while it performs half a step in the clockwise direction because one of the pins 47 extends into a groove 37 of the wheel 30C.

(3) When the output shaft has completed half a step in a counterclockwise direction (as per 1.3 above):

3.1 The output shaft is caused to perform a full step in a counterclockwise direction at a constant speed while a pin 46 extends into a groove 36 of the wheel 30B (such a pin travels downwardly, as viewed in FIG. 5); or 3.2 the output shaft is gradually decelerated to zero speed while it performs half a step in a counterclockwise direction because one of the pins 45 extends into one of the grooves 35 in the wheel 30A and the pin 45 travels downwardly, as viewed in FIG. 5.

(4) When the output shaft completes a full step in a clockwise direction (as per 2.1 above):

4.1 Clockwise angular displacement at a constant speed in a clockwise direction while a pin 46 extends into a groove 36; or 4.2 clockwise angular displacement by half a step with gradual deceleration to zero speed while a pin 47 extends into one of the grooves 37.

(5) When the output shaft completes a full step in a counterclockwise direction (as per 3.1 above):

5.1 Counterclockwise rotation by a full step at a constant speed while a pin 46 extends into a groove 46; or 5.2 counterclockwise rotation by half a step with gradual deceleration to zero speed while a pin 45 travels in a groove 35.

(6) When the output shaft completes half a step in a clockwise direction with gradual deceleration to zero speed (as per 2.2 above):

6.1 standstill as per 1.1 above; or
6.2 gradually accelerated clockwise rotation by half a step as per 1.2 above; or
6.3 gradually accelerated counterclockwise rotation as per 1.3 above.

(7) When the output shaft completes counterclockwise rotation by half a step as per 3.2:

7.1 standstill as per 1.1; or
7.2 gradual acceleration in a clockwise direction as per 1.2; or
7.3 gradual acceleration in a counterclockwise direction as per 1.3.

The minimal angular displacement of output shaft 3 in a clockwise or in a counterclockwise direction (by half a step) is determined by the lead of grooves 35, 37, and each angular displacement by half a step in a clockwise or in a counterclockwise direction can be followed by as many full steps in the same direction as desired (indexing pins 46 and grooves 36).

If the radius of the sleeve 30 on the output shaft 3 is increased to infinity, i.e., if the sleeve 30 is replaced by a plate, the transmission of the present invention can be used to effect controlled linear reciprocatory movements of an output member. Also, the indexing wheels 30A–30D can be replaced by grooved segments. The programming system which energizes and deenergizes the electromagnets 65, 65' in a desired sequence forms no part of my invention. The indexing wheel 30D performs the advantageous function of enabling the output shaft 3 to dwell in a desired angular position upon gradual deceleration to zero speed. Also, the wheel 30D can insure that the output shaft remains in a given angular position while one of the pins 45–47 moves to extended position. The projections of grooves 35, 37 which bring about gradual acceleration or deceleration of the output shaft 3 are curved (see FIG. 4 or 5) and the projections of grooves 36 which cause the output shaft to turn at a constant speed are straight. The transition from movements imparted by grooves 36 to movements imparted by grooves 35, 37 or vice versa is gradual.

In its simplest form, the transmission of my invention may comprise only two indexing wheels and a single carrier, for example, the wheels 30A, 30B and the carrier 4¹.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

I claim:

1. A transmission, comprising a driven input member; a movable output member including a plurality of indexing portions each having a surface provided with a set of parallel grooves, the lead of grooves in any one of said indexing portions being different from the lead of grooves in each other indexing portion; carrier means comprising at least one carrier reciprocable in parallelism with the axis of said input member and receiving motion therefrom; a plurality of indexing members movably supported by said carrier, there being one indexing member for each of said indexing portions; and control means for moving selected indexing members into the grooves of the respective indexing portions to influence the position of said output member in response to movement of said carrier while an indexing member extends into a groove of the associated indexing portion.

2. A transmission as defined in claim 1, wherein said input member is rotatable about said axis and wherein said output member is coaxial with said input member and is arranged to rotate in response to movement of at least one indexing member on said carrier into a groove of the associated indexing portion.

3. A transmission as defined in claim 2, wherein said indexing portions are wheels or wheel segments which are coaxial with said output member and wherein said surfaces are the peripheral surfaces of said indexing portions.

4. A transmission as defined in claim 3, wherein said input member is arranged to rotate in a predetermined direction at a predetermined speed and wherein said carrier means comprises a plurality of carriers whose reciprocatory movements are out of phase and each of which supports an indexing member for each of said indexing portions.

5. A transmission as defined in claim 4, wherein said carrier means comprises more than two carriers and wherein said carriers are equally spaced about the circumference of said input member.

6. A transmission as defined in claim 1, wherein the grooves in one of said indexing portions are parallel to the axis of said input member so that said output member is at a standstill when the corresponding indexing member of said carrier extends into a groove of said one indexing portion.

7. A transmission as defined in claim 1, wherein the lead of grooves in at least one of said indexing portions is such that the output member is gradually accelerated from zero speed to a predetermined maximum speed or vice versa when the corresponding indexing member of said carrier extends into a groove of said one indexing portion.

8. A transmission as defined in claim 7, wherein the lead of grooves in another of said indexing portions is such that the output member moves at said maximum speed when the corresponding indexing member extends into a groove in said other indexing portion.

9. A transmission as defined in claim 1, wherein said input member is rotatable about said axis and said output member is coaxial with said input member and is rotatable about said axis, said indexing portions including a first portion having grooves parallel with said axis, a second portion having grooves with a lead to effect gradual acceleration of said output member from zero speed to a predetermined speed, a third portion having grooves with a lead to maintain the output member at said predetermined speed, and a fourth portion having grooves with a lead to decelerate said output member from said predetermined speed to zero speed.

10. A transmission as defined in claim 1, wherein said carrier is movable back and forth between two end positions and said control means comprises clutching members coupled with said indexing members and movable between spaced positions to respectively extend the associated indexing members into or to withdraw such indexing members from the grooves of the respective indexing portions, and means for moving said clutching members between said spaced positions when said carrier assumes or approaches an end position.

11. A transmission as defined in claim 10, wherein the means for moving said clutching members comprises electromagnetically operated actuating members.

12. A transmission as defined in claim 10, wherein said clutching members are levers which are pivotable between said spaced positions and further comprising biasing means for urging each of said levers toward said spaced positions.

References Cited

UNITED STATES PATENTS

| | | | |
|---|---|---|---|
| 1,985,901 | 1/1935 | Liles | 74—57 |
| 2,246,733 | 6/1941 | Kiefer | 74—57 |
| 2,490,449 | 12/1949 | Lynch | 74—57 |
| 2,506,855 | 5/1950 | Casse | 74—393 XR |
| 2,849,710 | 8/1958 | Wade | 74—57 XR |
| 2,881,628 | 4/1959 | Hannon | 74—393 |
| 3,059,482 | 10/1962 | Petzoldt | 74—57 XR |

FRED C. MATTERN, Jr., Primary Examiner

F. D. SHOEMAKER, Assistant Examiner

U.S. Cl. X.R.

74—57